US012600585B2

(12) United States Patent
Kim et al.

(10) Patent No.: US 12,600,585 B2
(45) Date of Patent: Apr. 14, 2026

(54) LIFTING DEVICE AND ELECTRODE SHEET TRANSFER APPARATUS USING THE SAME

(71) Applicant: LG Energy Solution, Ltd., Seoul (KR)

(72) Inventors: Jong-Cheon Kim, Daejeon (KR); Jeong-Ho Yoon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 33 days.

(21) Appl. No.: 18/862,321

(22) PCT Filed: Apr. 20, 2023

(86) PCT No.: PCT/KR2023/005410
§ 371 (c)(1),
(2) Date: Nov. 1, 2024

(87) PCT Pub. No.: WO2023/239047
PCT Pub. Date: Dec. 14, 2023

(65) Prior Publication Data
US 2026/0042626 A1 Feb. 12, 2026

(30) Foreign Application Priority Data

Jun. 10, 2022 (KR) ........................ 10-2022-0070857

(51) Int. Cl.
B65H 3/08 (2006.01)
B25J 15/06 (2006.01)
H01M 10/04 (2006.01)

(52) U.S. Cl.
CPC ........ B65H 3/0883 (2013.01); B25J 15/0616 (2013.01); B65H 3/0816 (2013.01); H01M 10/0404 (2013.01)

(58) Field of Classification Search
CPC .. B65H 3/0816; B65H 3/0825; B65H 3/0833; B65H 3/0841; B65H 29/241; B25J 15/0616
See application file for complete search history.

(56) References Cited

U.S. PATENT DOCUMENTS 5,535,997 A * 7/1996 Croyle ................. B65H 3/0816
271/106
5,622,362 A 4/1997 Shiiki et al.
(Continued)

FOREIGN PATENT DOCUMENTS

CN 108638108 A 10/2018
EP 2149521 A1 * 2/2010 ........... B65H 3/0883
(Continued)

OTHER PUBLICATIONS

Extended European Search Report including Search Opinion from EP Appl. No. 23818216.6, dated Oct. 11, 2024, pp. 1-10.
(Continued)

*Primary Examiner* — Patrick Cicchino
(74) *Attorney, Agent, or Firm* — Lerner David LLP

(57) ABSTRACT

Disclosed is a lifting device and an electrode sheet transfer apparatus using the same. The lifting device is a device for lifting a sheet-shaped member, and includes a main suction plate configured to make surface contact with a central portion of the sheet-shaped member and adsorb the central portion; a sub suction plate configured to make surface contact with an edge portion of the sheet-shaped member located outside the central portion and adsorb the edge portion; and a lifting unit connected to the main suction plate and the sub suction plate respectively to raise or lower the main suction plate and the sub suction plate, wherein the lifting unit is configured to lift the main suction plate and the sub suction plate when the main suction plate and the sub suction plate adsorb the sheet-shaped member, so that the sub suction plate is raised before the main suction plate.

12 Claims, 6 Drawing Sheets

(56)     References Cited

U.S. PATENT DOCUMENTS

| | | | | |
|---|---|---|---|---|
| 7,942,403 | B2 * | 5/2011 | Dangelewicz | B65H 3/0816 |
| | | | | 271/106 |
| 10,189,167 | B2 * | 1/2019 | Shimizu | B25J 15/065 |
| 11,235,939 | B2 * | 2/2022 | Wade | B65G 47/91 |
| 2016/0280483 | A1 * | 9/2016 | Chen | B65H 1/14 |
| 2018/0071924 | A1 | 3/2018 | Shimizu et al. | |

FOREIGN PATENT DOCUMENTS

| | | | | | |
|---|---|---|---|---|---|
| EP | 3808515 | A1 | | 4/2021 | |
| JP | S6320553 | Y2 | | 6/1988 | |
| JP | H04507 | U | | 1/1992 | |
| JP | H05032331 | A | | 2/1993 | |
| JP | H08337329 | A | | 12/1996 | |
| JP | H09002680 | A | | 1/1997 | |
| JP | H11239991 | A | | 9/1999 | |
| JP | 2002019988 | A | * | 1/2002 | |
| JP | 2013089678 | A | | 5/2013 | |
| JP | 5667127 | B2 | | 2/2015 | |
| JP | 2016216210 | A | | 12/2016 | |
| JP | 6252775 | B2 | | 12/2017 | |
| JP | 6367158 | B2 | | 8/2018 | |
| KR | 101208998 | B1 | | 12/2012 | |
| KR | 101318045 | B1 | | 10/2013 | |
| KR | 1020170132558 | A | | 12/2017 | |
| KR | 1020220069406 | A | | 5/2022 | |
| KR | 20240173986 | A | * | 12/2024 | H01M 10/0404 |

OTHER PUBLICATIONS

International Search Report for Application No. PCT/KR2023/
005410 mailed Aug. 16, 2023. 3 pgs.

* cited by examiner

FIG. 9

LIFTING DEVICE AND ELECTRODE SHEET TRANSFER APPARATUS USING THE SAME

CROSS-REFERENCE TO RELATED APPLICATIONS

The present application is a national phase entry under 35 U.S.C. § 371 of International Application No. PCT/KR2023/005410 filed on Apr. 20, 2023, published in Korean, which claims priority from Korean Patent Application No. 10-2022-0070857 filed Jun. 10, 2022, all of which are incorporated herein by reference.

TECHNICAL FIELD

The present disclosure relates to a lifting device and an electrode sheet transfer apparatus using the same, and more particularly, to a lifting device for adsorbing and lifting a sheet-shaped member and an electrode sheet transfer apparatus using the same.

BACKGROUND ART

In general, an electrode assembly of a secondary battery that may be repeatedly charged and discharged is manufactured by stacking and winding a plurality of stack structures in which a separator is located between a first electrode corresponding to a positive electrode (cathode) and a second electrode corresponding to a negative electrode (anode). In order to automate the process of manufacturing such an electrode assembly, a transfer apparatus for transferring sheet-shaped electrodes or separators is required.

However, as disclosed in Japanese Patent Registration No. 5667127, the conventional technology of adsorbing and transferring a sheet-shaped member with a suction plate has a problem in that, in the process of adsorbing and lifting a sheet-shaped member, due to the pressure generated when the sheet-shaped member comes into face-to-face contact with a table or another member located under the sheet-shaped member, adsorption of the sheet-shaped member fails or the adsorbed sheet-shaped member is dropped. If the sheet-shaped member is lifted by increasing the adsorption force of the suction plate in order to solve this problem, there is a risk of causing deformation or damage to the sheet-shaped member.

Furthermore, in the conventional technology, even when the edge portion of the sheet-shaped member is curved, the flat suction surface of the suction plate is brought into close contact with the sheet-shaped member as it is to adsorb the sheet-shaped member, so there is a problem in that it causes wrinkles or fails to adsorb the sheet-shaped member due to the separation between the suction plate and the sheet-shaped member.

DISCLOSURE

Technical Problem

The technical problem to be solved by the present disclosure is to provide a lifting device that accurately adsorbs and separates a sheet-shaped member in face-to-face contact with a table or another member without deformation or damage, and an electrode sheet transfer apparatus using the same.

Another technical problem to be solved by the present disclosure is to provide a lifting device that safely lifts the sheet-shaped member without adsorption failure, without causing wrinkles in the sheet-shaped member even when the edge portion of the sheet-shaped member is curved, and an electrode sheet transfer apparatus using the same.

Technical Solution

A lifting device according to an embodiment of the present disclosure comprises a main suction plate configured to make surface contact with a central portion of the sheet-shaped member and adsorb the central portion; a sub suction plate configured to make surface contact with an edge portion of the sheet-shaped member located outside the central portion and adsorb the edge portion; and a lifting unit connected to the main suction plate and the sub suction plate respectively to raise or lower the main suction plate and the sub suction plate, wherein the lifting unit is configured to lift the main suction plate and the sub suction plate when the main suction plate and the sub suction plate adsorb the sheet-shaped member, so that the sub suction plate is raised before the main suction plate.

In an embodiment, the sub suction plate may be included in plurality, at least one first sub suction plate among the plurality of sub suction plates may be configured to adsorb an edge portion at one end of the sheet-shaped member, and at least one second sub suction plate among the plurality of sub suction plates may be configured to adsorb an edge portion at the other end of the sheet-shaped member located opposite to the one end.

In an embodiment, the lifting unit may include a first lifting unit that raises one end of the sub suction plate to a first height, among one end of the sub suction plate located at an edge of the sheet-shaped member and the other end of the sub suction plate located at a center of the sheet-shaped member, when the main suction plate and the sub suction plate adsorb the sheet-shaped member.

In an embodiment, the first lifting unit may include a first guide rail extended in a horizontal direction; a first movement module that moves along the first guide rail; and a first support leg having one end connected to the first movement module and the other end connected to the sub suction plate to support the sub suction plate, and configured to raise the one end of the sub suction plate or lower the raised one end along a movement direction of the first movement module.

In an embodiment, the first support leg may include at least one joint.

In an embodiment, the lifting unit may further include a second lifting unit that raises the main suction plate and the sub suction plate to a second height, when the one end of the sub suction plate is raised to the first height.

In an embodiment, the lifting device may further comprise a posture control unit that connects the sub suction plate and the lifting unit and adjusts the posture of the sub suction plate according to a curve or inclination of the edge portion with which the sub suction plate comes into contact.

In an embodiment, the posture control unit may include an elastic member coupled to the sub suction plate; and a support frame coupled to the lifting unit to support the elastic member.

In an embodiment, the elastic member may include a plurality of compression springs having one end fixed to the sub suction plate and the other end fixed to the support frame.

In an embodiment, the lifting device 100 may further comprise a flattening unit that flattens the sheet-shaped member using a roll, before the main suction plate and the sub suction plate come into contact with the sheet-shaped member.

In an embodiment, the flattening unit may include a second guide rail extended in a horizontal direction; a second movement module that moves along the second guide rail; and a second support leg having one end connected to the second movement module and the other end connected to the roll to support the roll.

An electrode sheet transfer apparatus according to an embodiment of the present disclosure is configured to transfer an electrode sheet using the lifting device according to any one of the above embodiments.

Advantageous Effects

According to the present disclosure, when the main suction plate adsorbed to the central portion of the sheet-shaped member and the sub suction plate adsorbed to the edge portion of the sheet-shaped member are adsorbed to the sheet-shaped member, the lifting unit raises the main suction plate and the sub suction plate, so that the sub suction plate is raised before the main suction plate, so it is possible to accurately adsorb and separate the sheet-shaped member in face-to-face contact with a table or another member without deformation or damage.

In addition, since the first lifting unit for lifting the sub suction plate includes a movement module that moves along a guide rail extending in the horizontal direction and a support leg connected to the movement module to support the sub suction plate, when the size of the sheet-shaped member subject to absorption is changed, the position of the sub suction plate can be easily changed by adjusting the horizontal position of the movement module. As a result, the lifting device according to the present disclosure can be applied to transfer sheet-shaped members of various sizes.

In addition, since the movement module is configured to be moved by a precisely controllable servomotor, it is possible to precisely control the movement distance of the movement module in the horizontal direction, and as a result, the rising height and inclination of the sub suction plate can be precisely controlled depending on the size, flexibility, strength, etc. of the sheet-shaped member.

In addition, since the posture control unit connecting the sub suction plate and the lifting unit adjusts the posture of the sub suction plate according to the bending of the sheet-shaped member, even when the edge portion of the sheet-shaped member is curved, the corresponding sheet-shaped member can be safely lifted without adsorption failure, without causing wrinkles in the corresponding sheet-shaped member.

In addition, since the flattening unit flattens the sheet-shaped member using a roll before the main suction plate and the sub suction plate come into contact with the sheet-shaped member, it is possible to ensure the accuracy and reliability of the adsorption operation performed by the main suction plate and the sub suction plate and improve the adsorption performance.

Furthermore, one of ordinary skill in the art will clearly understand from the following description that various embodiments of the present disclosure may also be used to solve various technical problems not mentioned above.

DESCRIPTION OF DRAWINGS

FIG. 9 is a view showing an electrode sheet flattening operation of the lifting device shown in FIG. 8.

BEST MODE

Hereinafter, embodiments of the present disclosure will be described in detail with reference to the accompanying drawings to provide solutions to the technical problems of the present disclosure. However, in the description of the present disclosure, detailed explanations of related known technologies are omitted when it is deemed that they may unnecessarily obscure the essence of the present disclosure. Also, the terms used herein are those defined in consideration of functions in the present disclosure, and may vary according to the intention of designers or manufacturers, precedents, etc. Hence, the terms used herein should be defined based on the meaning of the terms together with the descriptions throughout the specification.

Figure 1:
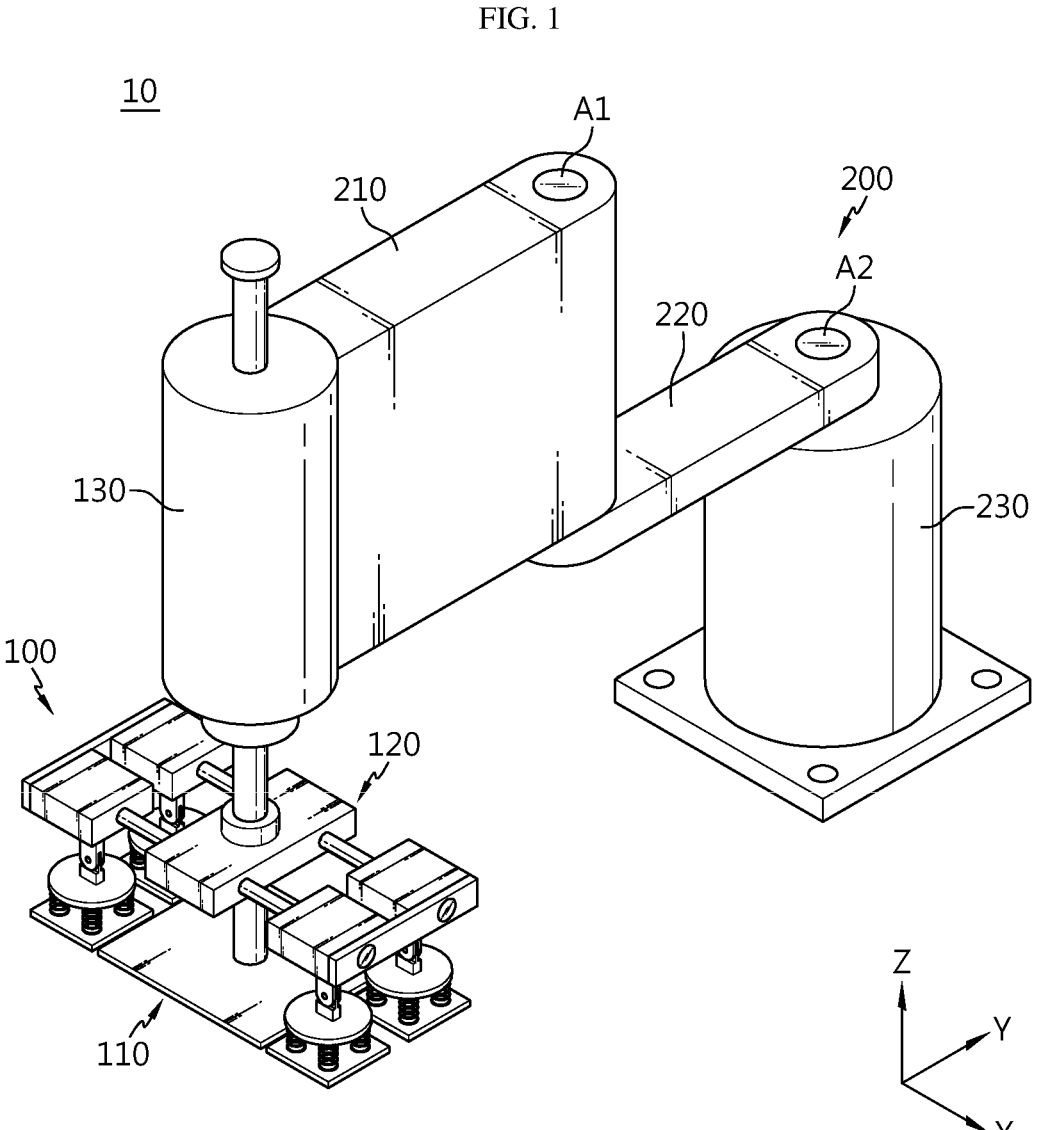
FIG. 1 is a perspective view showing an electrode sheet transfer apparatus according to an embodiment of the present disclosure.

FIG. 1 is a perspective view showing an electrode sheet transfer apparatus 10 according to an embodiment of the present disclosure.

As shown in FIG. 1, the electrode sheet transfer apparatus 10 according to an embodiment of the present disclosure is a device for adsorbing and transferring an electrode sheet, and may include a lifting device 100 according to the present disclosure and a robot arm 200.

The lifting device 100 may be configured to adsorb and raise or lower an electrode sheet used in manufacturing an electrode assembly of a secondary battery. As will be described again below, the lifting device 100 may include a suction unit 110 that adsorbs an electrode sheet, and a lifting unit 120, 130 that raise or lower the suction unit 110.

In this specification, the 'electrode sheet' may refer to various sheet-shaped members used in the manufacture of secondary batteries. For example, the 'electrode sheet' may mean a positive electrode sheet, a negative electrode sheet, or a separator sheet.

The robot arm 200 may be configured to move the lifting device 100 from a current position to a target position. To this end, the robot arm 200 may include various types of articulated robot arms. For example, the robot arm 200 may include a plurality of joints rotating in a horizontal direction like a SCARA (Selective Compliance Assembly Robot Arm).

In one embodiment, the robot arm 200 may include a first arm unit 210, a second arm unit 220, and a support unit 230.

In this case, the first arm unit 210 may be configured to support the lifting device 100 by being combined with the lifting unit 130 of the lifting device 100, and move the lifting device 100 by rotating around the first shaft A1.

The second arm unit 220 may be configured to support the first arm unit 210 and rotate around the second shaft A2 to move the first arm unit 210.

The support unit 230 may be fixed at a predetermined position and configured to support the second arm unit 220.

The first shaft A1 corresponding to the center of rotation of the first arm unit 210 and the second shaft A2 corresponding to the center of rotation of the second arm unit 220 may be configured parallel to each other. Depending on the embodiment, the first shaft A1 and the second shaft A2 may be orthogonal to each other or cross at a specific angle.

Figure 2:
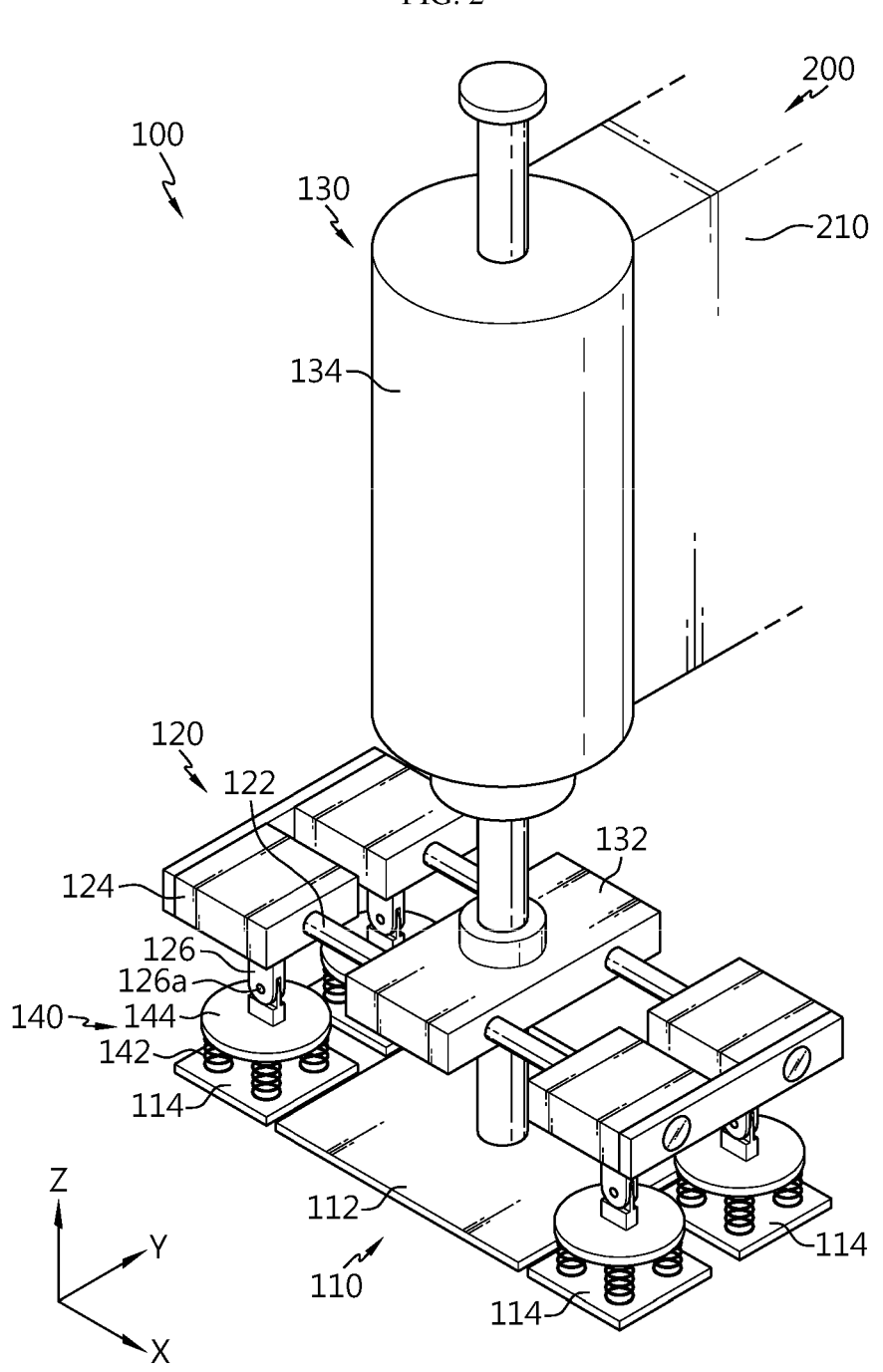
FIG. 2 is a perspective view showing a lifting device according to an embodiment of the present disclosure.

FIG. 2 is a perspective view showing a lifting device 100 according to an embodiment of the present disclosure.

As shown in FIG. 2, the lifting device 100 according to an embodiment of the present disclosure is a device that adsorbs and lifts or lowers a sheet-shaped member such as an electrode sheet, and may include a suction unit 110, a lifting unit 120, 130, and a posture control unit 140.

The suction unit 110 may be configured to adsorb a sheet-shaped member. To this end, the suction unit 110 may include a main suction plate 112 and a sub suction plate 114. In particular, the suction unit 110 may include the sub suction plate 114 in plurality.

The main suction plate 112 may be configured to adsorb the central portion of the sheet-shaped member by making surface contact with the central portion of the sheet-shaped member. To this end, a plurality of micro intake ports through which air is sucked may be provided in the bottom surface of the main suction plate 112. Also, air passages communicating with the micro intake ports may be provided inside the main suction plate 112.

The sub suction plate 114 may be configured to adsorb an edge portion of the sheet-shaped member by making surface contact with the edge portion of the sheet-shaped member located outside the central portion. To this end, a plurality of micro intake ports through which air is sucked may be provided in the bottom surface of the sub suction plate 114. In addition, air passages communicating with the micro intake ports of the sub suction plate 114 may be provided inside the sub suction plate 114.

In addition, the sub suction plate 114 may be configured to have a smaller size and area than the main suction plate 112. The main purpose of the main suction plate 112 is to provide a suction power for the transfer of the sheet-shaped member, while the main purpose of the sub suction plate 114 is to lift only the edge portion of the sheet-shaped member in order to dissipate the pressure generated when the corresponding sheet-shaped member makes face-to-face contact with a table or another member.

As mentioned above, the suction unit 110 of the lifting device 100 may include a plurality of sub suction plates 114 described above. In this case, the plurality of sub suction plates may be disposed adjacent to the main suction plate 112, so that at least one first sub suction plate among the plurality of sub suction plates adsorbs the edge portion at one end of the sheet-shaped member, and at least one second sub suction plate among the plurality of sub suction plates adsorbs the edge portion at the other end of the sheet-shaped member located opposite the one end.

For example, the suction unit 110 may include two first sub suction plates disposed adjacent to one end of the main suction plate 112, and two second sub suction plates disposed adjacent to the other end of the main suction plate 112 opposite to the one end as shown in FIG. 2.

In one embodiment, the lifting device 100 may further include a pump (not shown) that generates a negative pressure inside the air passages of the main suction plate 112 and the sub suction plate 114 so that air is sucked through the micro intake ports of the main suction plate 112 and the sub suction plate 114.

The lifting unit 120, 130 may be connected to the main suction plate 112 and the sub suction plate 114 to raise or lower the main suction plate 112 and the sub suction plate 114.

In particular, the lifting unit 120, 130 may be configured to raise the main suction plate 112 and the sub suction plate 114 when the main suction plate 112 and the sub suction plate 114 adsorb the sheet-shaped member, so that the sub suction plate 114 is raised before the main suction plate 112. To this end, the lifting unit 120, 130 may include a first lifting unit 120 and a second lifting unit 130.

The first lifting unit 120 may be connected to the sub suction plate 114 to support the sub suction plate 114. In addition, the first lifting unit 120 may be configured to raise one end of the sub suction plate 114 to a first height or lower the raised one end to its original position, among one end of the sub suction plate 114 located at the edge of the sheet-shaped member and the other end of the sub suction plate 114 located at the center of the corresponding sheet-shaped member.

For example, when the main suction plate 112 and the sub suction plate 114 adsorb the sheet-shaped member, the first lifting unit 120 may raise one end of the sub suction plate 114 to a first height, among one end of the sub suction plate 114 located at the edge of the sheet-shaped member and the other end of the sub suction plate 114 located at the center of the corresponding sheet-shaped member, in the state of maintaining the main suction plate 112 as it is.

To this end, the first lifting unit 120 may include a guide rail 122, a movement module 124, and a support leg 126.

The guide rail 122 is supported by the vertical movement frame 132 of the second lifting unit 130 to be described later and may be configured to extend in a horizontal direction (X-axis direction).

The movement module 124 may be configured to move in a horizontal direction (X-axis direction) along the guide rail 122. To this end, the movement module 124 may include a driving motor or actuator that generates power.

For example, the movement module 124 may be configured to be moved by a precisely controllable servomotor. In this case, the movement distance of the movement module 124 in the horizontal direction can be precisely controlled, and as a result, the rising height and inclination of the sub suction plate 114 can be precisely adjusted according to the size, flexibility, and strength of the sheet-shaped member.

The support leg 126 may be configured such that one end is connected to the movement module 124 and the other end is directly, or indirectly through the posture control unit 140 to be described later, connected to the sub suction plate 114 to raise one end of the sub suction plate 114 or lower the raised one end along the movement direction of the movement module 124, while supporting the sub suction plate 114. To this end, the support leg 126 may have at least one joint 126a.

As described above, since the first lifting unit 120 for lifting the sub suction plate 114 includes a movement module 124 moving along the guide rail 122 extending in the horizontal direction and a support leg 126 connected to the movement module 124 to support the sub suction plate 114, when the size of the sheet-shaped member to be adsorbed is changed, the position of the sub suction plate 114 can be easily changed by adjusting the horizontal position of the movement module 124. As a result, the lifting device according to the present disclosure can be applied to transfer of sheet-shaped members of various sizes.

The second lifting unit 130 may be coupled to and supported by the first arm unit 210 of the above-described robot arm 200, and may be configured to raise or lower the main suction plate 112 and the sub suction plate 114 together.

For example, when one end of the sub suction plate 114 is raised to a first height by the first lifting unit 120, the second lifting unit 130 can lift the main suction plate 112 and the sub suction plate 114 together to a second height.

To this end, the second lifting unit 130 may include a vertical movement frame 132 and a driving module 134.

The vertical movement frame 132 supports the main suction plate 112 and the guide rail 122 of the first lifting unit 120, and may be configured to be movable in a vertical direction (Z-axis direction). Of course, the vertical movement frame 132 can be configured in various forms.

The driving module 134 is coupled to and supported by the first arm unit 210 of the above-described robot arm 200, and may be configured to move the vertical movement frame 132 in a vertical direction (Z-axis direction). To this end, the driving module 134 may include a motor or actuator capable of moving the vertical movement frame 132 upward or downward.

The posture control unit 140 connects the sub suction plate 114 and the first lifting unit 120, and may be configured to adjust the posture of the sub suction plate 114 according to the curve or inclination of the edge portion of the sheet-shaped member with which the sub suction plate 114 comes into contact.

In particular, the posture control unit 140 may be configured to adjust the posture of the sub suction plate 114 by using an elastic member 142 coupled to the sub suction plate 114.

In this case, the posture control unit 140 may include a support frame 144 coupled to the support leg 126 of the first lifting unit 120 to support the elastic member 142, together with the elastic member 142 coupled to the sub suction plate 114.

Also, the elastic member 142 may include a plurality of compression springs having one end fixed to the sub suction plate 114 and the other end fixed to the support frame 144.

In addition, the support frame 144 may be configured in various forms. That is, the support frame 144 may be configured in a plate shape as shown in FIG. 2, or may be configured in a ring shape or a cone shape according to embodiments.

Figure 3:
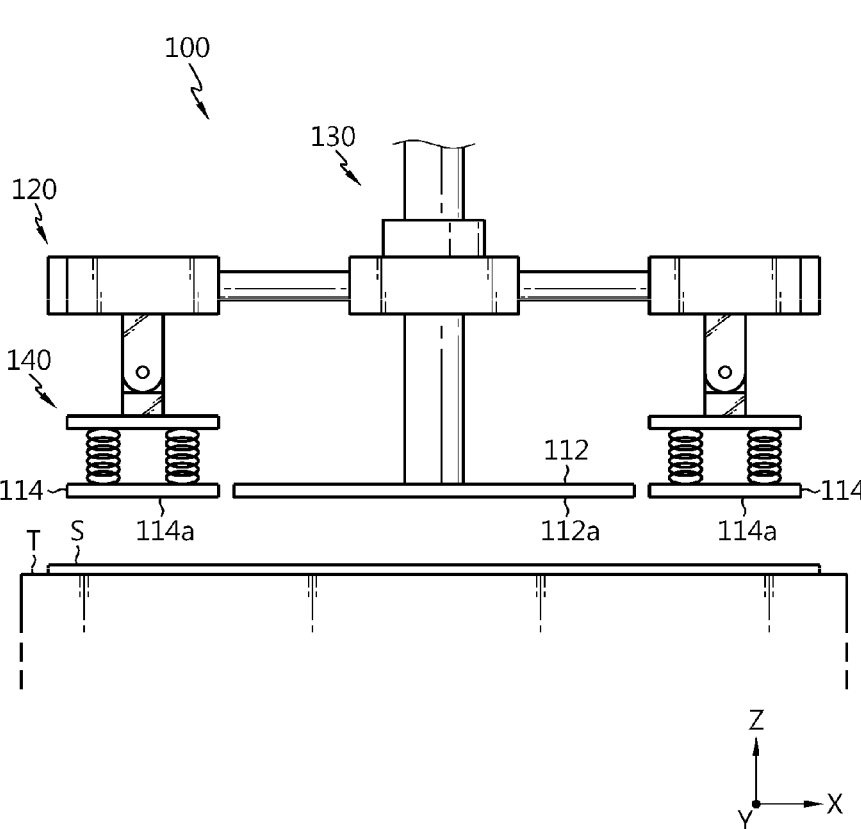
FIG. 3 is a front view showing the lifting device shown in FIG. 2.

FIG. 3 is a front view showing the lifting device 100 shown in FIG. 2.

As shown in FIG. 3, the lifting device 100 may include a main suction plate 112, a sub suction plate 114, a first lifting unit 120, a second lifting unit 130, and a posture control unit 140.

The main suction plate 112 may be configured to adsorb the central portion of the electrode sheet S by making surface contact with the central portion of the electrode sheet S. As described above, a plurality of micro intake ports through which air is sucked may be provided in the bottom surface 112a of the main suction plate 112 in surface contact with the electrode sheet S.

The sub suction plate 114 may be configured to adsorb the edge portion of the electrode sheet S by making surface contact with the edge portion of the electrode sheet S located outside the central portion of the electrode sheet S. As described above, a plurality of micro intake ports through which air is sucked may be provided in the bottom surface 114a of the sub suction plate 114 in surface contact with the electrode sheet S.

Also, the lifting device 100 may include the sub suction plate 114 in plurality. For example, the lifting device 100 may include at least one sub suction plate disposed adjacent to one end of the main suction plate 112 to adsorb the edge portion at one end of the electrode sheet S and at least one sub suction plate disposed adjacent to the other end of the main suction plate 112 to adsorb the edge portion at the other end of the electrode sheet S.

The sub suction plate 114 may be connected to the posture control unit 140, and the posture control unit 140 may be connected to the first lifting unit 120. That is, the sub suction plate 114 may be indirectly connected to the first lifting unit 120 by the posture control unit 140 and supported by the first lifting unit 120. On the other hand, the main suction plate 112 may be directly connected to and supported by the second lifting unit 130.

The first lifting unit 120 may be connected to and supported by the second lifting unit 130, and the second lifting unit 130 may be connected to and supported by the first arm unit 210 of the robot arm 200 described above.

This lifting device 100 may be moved by the above-described robot arm 200 and positioned above the electrode sheet S placed on the table T.

Figure 4:
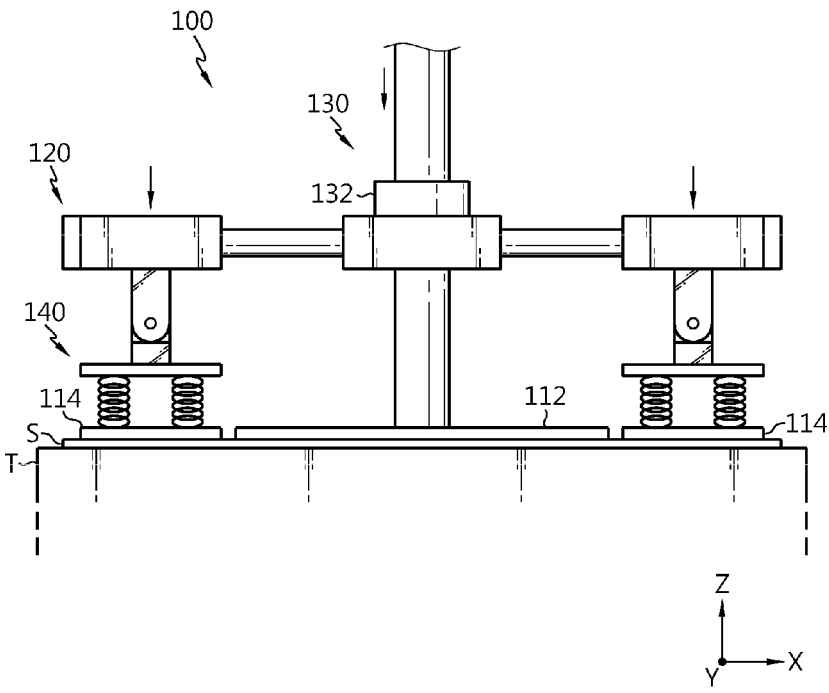
FIG. 4 is a view showing an electrode sheet adsorption operation of the lifting device shown in FIG. 3.

FIG. 4 is a view showing an electrode sheet adsorption operation of the lifting device 100 shown in FIG. 3.

As shown in FIG. 4, the lifting device 100 may perform an electrode sheet adsorption operation above the electrode sheet S placed on the table T.

That is, the vertical movement frame 132 of the second lifting unit 130 may move downward, so that the main suction plate 112 and the sub suction plate 114 directly or indirectly supported by the vertical movement frame 132 may come into surface contact with the electrode sheet S.

Next, the main suction plate 112 and the sub suction plate 114 may adsorb the electrode sheet S by sucking air through the micro intake ports provided in the bottom surfaces thereof, respectively. At this time, the main suction plate 112 may adsorb the central portion of the electrode sheet S, and the sub suction plate 114 may adsorb the edge portion of the electrode sheet S.

Figure 5:
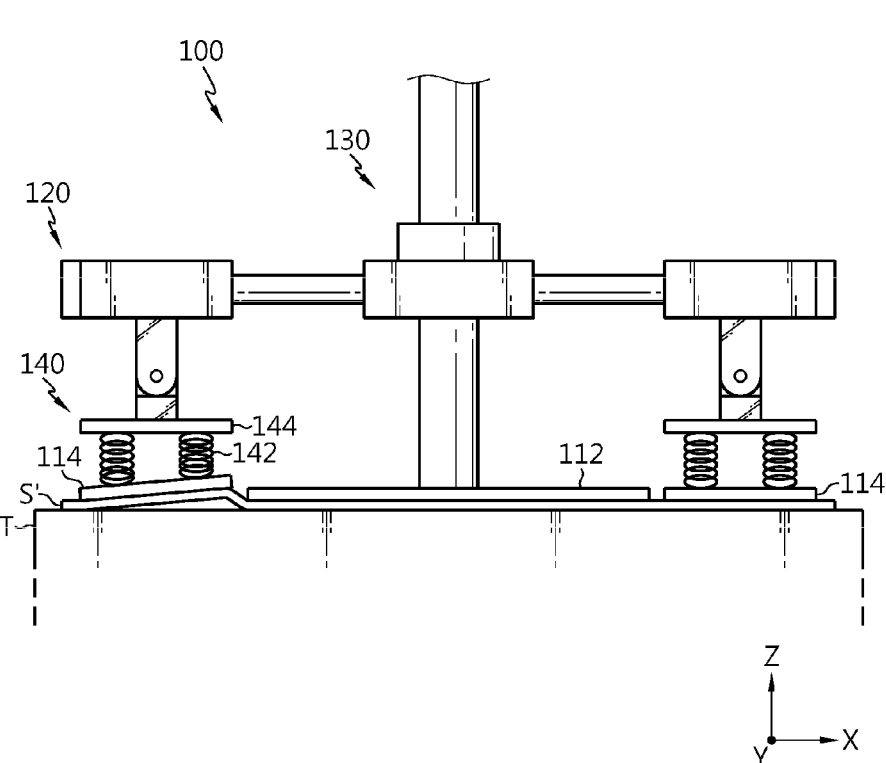
FIG. 5 is a view showing a modified electrode sheet adsorption operation of the lifting device shown in FIG. 3.

FIG. 5 is a view showing a modified electrode sheet adsorption operation of the lifting device 100 shown in FIG. 3.

As shown in FIG. 5, even when the edge portion of the electrode sheet S' placed on the table T is curved, the lifting device 100 can accurately perform the electrode sheet adsorption operation.

That is, when the vertical movement frame 132 of the second lifting unit 130 moves downward so that the main suction plate 112 and the sub suction plate 114 directly or indirectly supported by the vertical movement frame 132 come into contact with the electrode sheet S', the posture control unit 140 may adjust the posture of the sub suction plate 114 according to the curve or inclination of the corresponding edge portion by using the elastic force of the elastic member 142 coupled to the sub suction plate 114.

As a result, the sub suction plate 114 can stably make surface contact with the edge portion of the curved electrode sheet S' and adsorb the corresponding edge portion.

Figure 6:
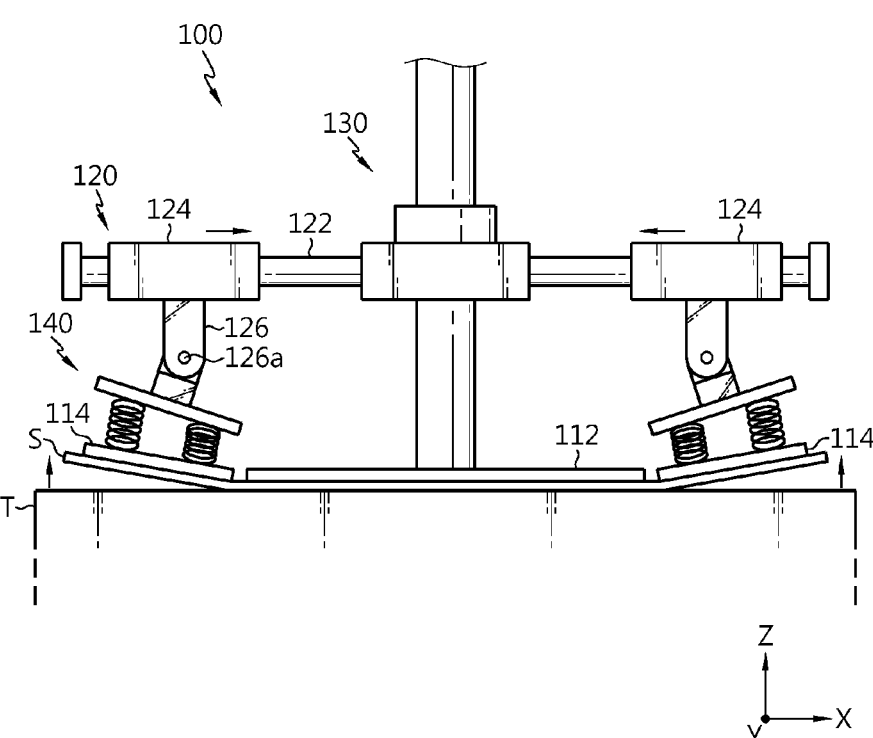
FIGS. 6 and 7 are views showing an electrode sheet lifting operation of the lifting device shown in FIG. 4.
Figure 7:
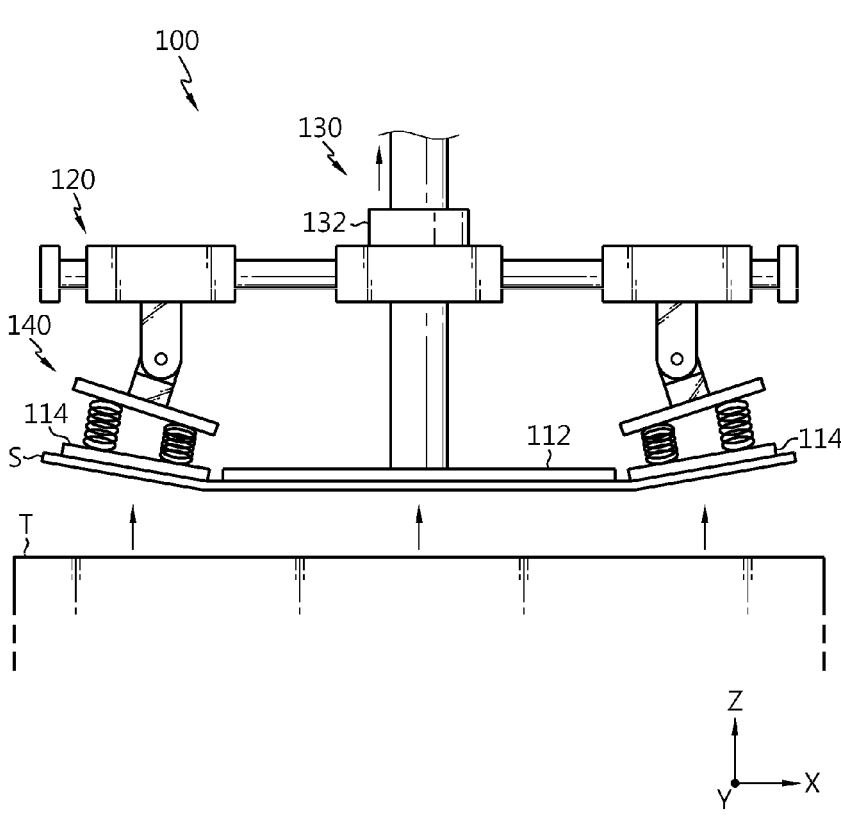

FIGS. 6 and 7 are views showing an electrode sheet lifting operation of the lifting device shown in FIG. 4.

As shown in FIG. 6, when the main suction plate 112 and the sub suction plate 114 adsorb the electrode sheet S, the first lifting unit 120 may raise one end of the sub suction plate 114 to a first height, among one end of the sub suction plate 114 located at the edge of the electrode sheet S and the other end of the sub suction plate 114 located at the center of the corresponding electrode sheet S, in the state of maintaining the main suction plate 112 as it is.

That is, the first lifting unit 120 can lift the left end of the sub suction plate located at the left side of the main suction plate 112 in FIG. 6 and the right end of the sub suction plate located at the right side of the main suction plate 112 to the first height, respectively.

In this case, the movement module 124 of the first lifting unit 120 may move toward the center of the electrode sheet S along the guide rail 122, so that the support leg 126 connected to the movement module 124 moves in the same direction.

Then, the lower end of the support leg 126 is rotated at a predetermined angle around the joint 126a to raise the one end of the sub suction plate 114 to a first height. As a result, the central portion of the electrode sheet S is still placed on the table T, and only the edge portion of the electrode sheet S is raised obliquely.

Then, as shown in FIG. 7, when the one end of the sub suction plate 114 is raised to the first height, the vertical movement frame 132 of the second lifting unit 130 may move upward, so that the main suction plate 112 and the sub suction plate 114 directly or indirectly supported by the vertical movement frame 132 is raised to the second height.

In this way, when the lifting device 100 adsorbs and lifts the electrode sheet S, the above-described robot arm 200 can transfer the corresponding electrode sheet S by moving the lifting device 100 to a target position.

The lifting device 100, which has arrived at the target position, moves the vertical movement frame 132 of the second lifting unit 130 downward again, and moves the movement module 124 of the first lifting unit 120 to its original position, so that the electrode sheet S may be placed at the target position.

Figure 8:
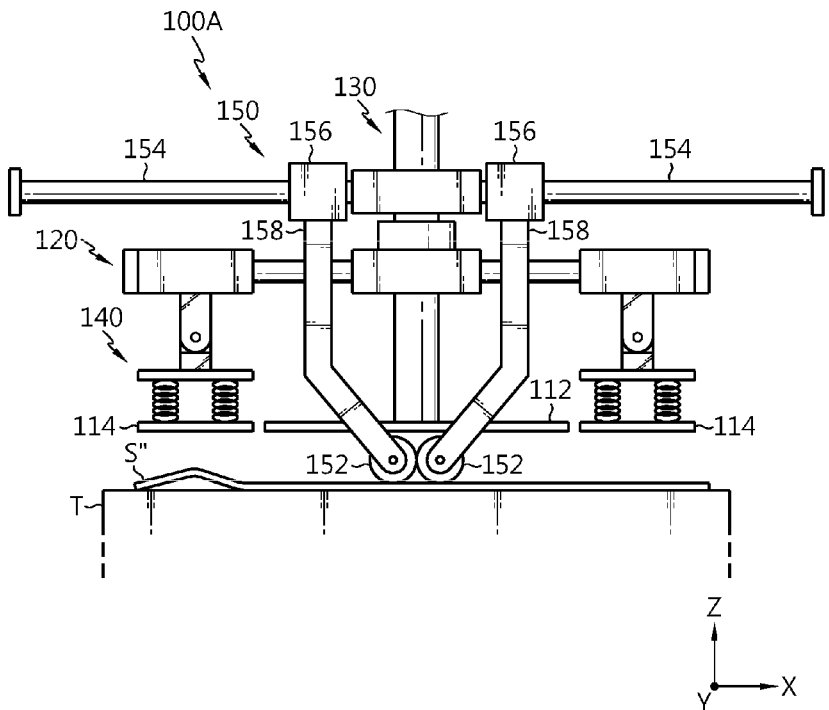
FIG. 8 is a view showing a lifting device according to a modified embodiment of the present disclosure.

FIG. 8 is a view showing a lifting device 100A according to a modified embodiment of the present disclosure.

As shown in FIG. 8, the lifting device 100A according to the modified embodiment of the present disclosure may include the main suction plate 112, the sub suction plate 114, the first lifting unit 120, the second lifting unit 130 and the posture control unit 140, described with reference to FIGS. 2 to 7. In particular, the lifting device 100A may further include a flattening unit 150.

The flattening unit 150 may be configured to flatten the electrode sheet S" using a roll 152 before the main suction plate 112 and the sub suction plate 114 come into contact with the electrode sheet S" corresponding to the sheet-shaped member.

For example, the lifting device 100A located above the curved electrode sheet S" may drive the flattening unit 150 to flatten the corresponding electrode sheet S" before lowering the main suction plate 112 and sub suction plate 114 toward the electrode sheet S" by driving the second lifting unit 130.

To this end, the flattening unit 150 may include a guide rail 154, a movement module 156, and a support leg 158.

The guide rail 154 is supported by the second lifting unit 130 and may be configured to extend in a horizontal direction (X-axis direction).

The movement module 156 may be configured to move in a horizontal direction (X-axis direction) along the guide rail 154. To this end, the movement module 156 may include a driving motor or actuator that generates power. For example, the movement module 156 may be configured to be moved by a precisely controllable servomotor.

The support leg 158 may have one end connected to the movement module 156 and the other end connected to the roll 152 to support the corresponding roll 152.

Figure 9:
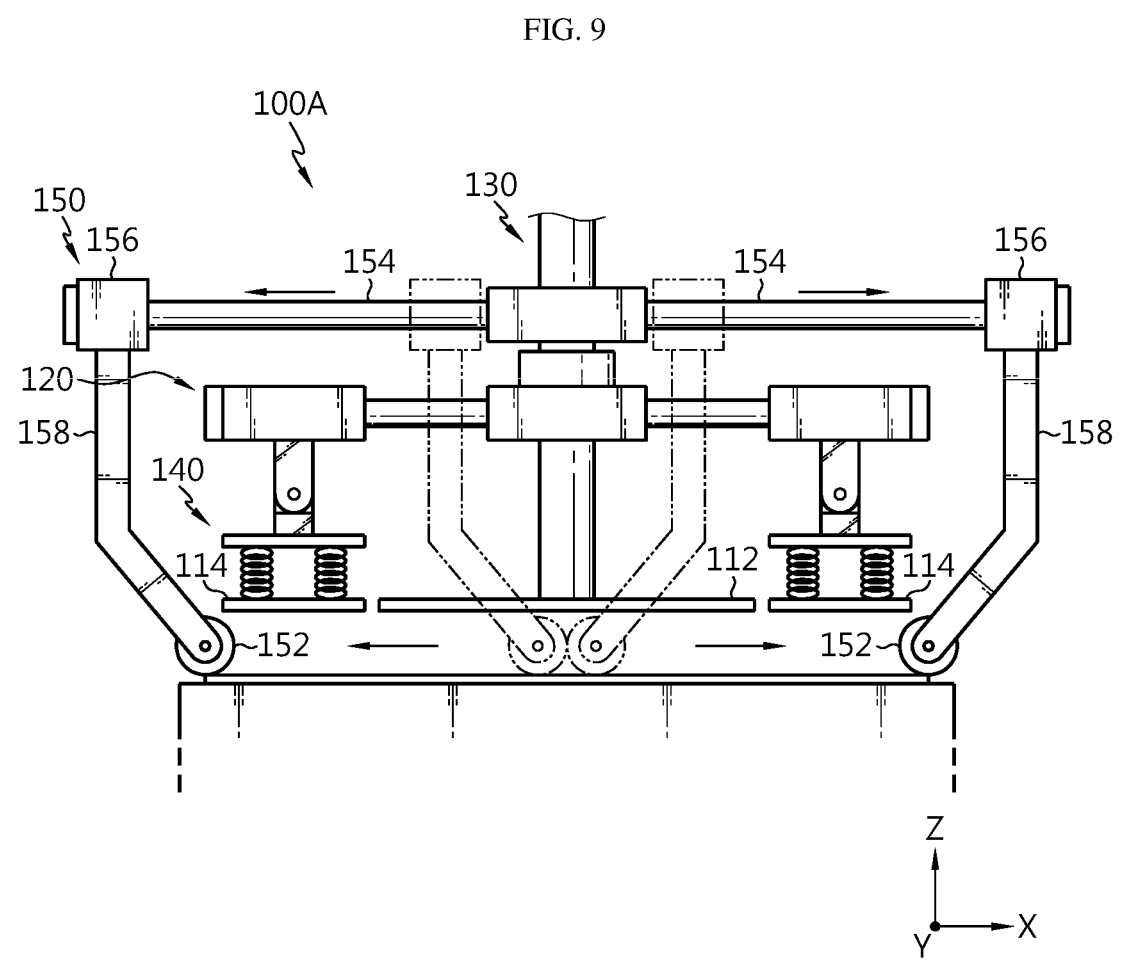

FIG. 9 is a view showing an electrode sheet flattening operation of the lifting device 100A shown in FIG. 8.

As shown in FIG. 9, when the lifting device 100A is positioned above the electrode sheet S" by the above-described robot arm 200, the second lifting unit 130 of the lifting device 100A may lower the flattening unit 150 so that the roll 152 of the flattening unit 150 is brought into close contact with the electrode sheet S", before the main suction plate 112 and the sub suction plate 114 are lowered toward the electrode sheet S".

Then, the flattening unit 150 may flatten the corresponding electrode sheet S" by moving the roll 152 left and right while the roll 152 is in close contact with the electrode sheet S".

In this case, the movement module 156 of the flattening unit 150 may move in the left and right direction (X-axis direction) along the guide rail 154 to perform the flattening operation by moving the support leg 158 connected to the movement module 156 and the roll 152 supported by the support leg 158 in the left and right directions.

Thereafter, the lifting device 100A may perform the electrode sheet adsorption operation and the electrode sheet lifting operation described with reference to FIGS. 4 to 7.

As described above, according to the present disclosure, when the main suction plate 112 adsorbed to the central portion of the sheet-shaped member and the sub suction plate 114 adsorbed to the edge portion of the sheet-shaped member are adsorbed to the sheet-shaped member, the lifting unit 120, 130 raise the main suction plate 112 and the sub suction plate 114, so that the sub suction plate 114 is raised before the main suction plate 112, and thus it is possible to easily adsorb and separate the sheet-shaped member in face-to-face contact with a table or another member without deformation or damage.

In addition, since the first lifting unit for lifting the sub suction plate includes a movement module that moves along a guide rail extending in the horizontal direction and a support leg connected to the movement module to support the sub suction plate, when the size of the sheet-shaped member subject to absorption is changed, the position of the sub suction plate can be easily changed by adjusting the horizontal position of the movement module. As a result, the lifting device according to the present disclosure can be applied to transfer sheet-shaped members of various sizes.

In addition, since the movement module is configured to be moved by a precisely controllable servomotor, it is possible to precisely control the movement distance of the movement module in the horizontal direction, and as a result, the rising height and inclination of the sub suction plate can be precisely controlled depending on the size, flexibility, strength, etc. of the sheet-shaped member.

In addition, since the posture control unit 140 connecting the sub suction plate 114 and the lifting unit 120 adjusts the posture of the sub suction plate 114 according to the bending of the sheet-shaped member, even when the edge portion of the sheet-shaped member is curved, the corresponding sheet-shaped member can be safely lifted without adsorption failure, without causing wrinkles in the corresponding sheet-shaped member.

In addition, since the flattening unit 150 flattens the sheet-shaped member using a roll 152 before the main suction plate 112 and the sub suction plate 114 come into contact with the sheet-shaped member, it is possible to ensure the accuracy and reliability of the adsorption operation performed by the main suction plate 112 and the sub suction plate 114 and improve the adsorption performance.

Furthermore, one of ordinary skill in the art will clearly understand from the following description that embodiments of the present disclosure may also be used to solve various technical problems not mentioned above.

The present disclosure has been described with reference to the specific embodiments. However, it will be understood by one of ordinary skill in the art that various modifications may be made within the scope of the present disclosure. Hence, the disclosed embodiments should be considered in descriptive sense only and not for purposes of limitation. That is, the scope of the present disclosure is defined only by the following claims, and all differences within the scope will be construed as being included in the present disclosure.

What is claimed is:

1. A lifting device for lifting a sheet-shaped member, comprising:

a main suction plate configured to make surface contact with a central portion of the sheet-shaped member and adsorb the central portion;

at least one sub suction plate configured to make surface contact with an edge portion of the sheet-shaped member located outside the central portion and adsorb the edge portion; and a lifting unit connected to the main suction plate and the sub suction plate, respectively, to raise or lower the main suction plate and the sub suction plate, wherein the lifting unit is configured to lift the main suction plate and the sub suction plate when the main suction plate and the at least one sub suction plate adsorb the sheet-shaped member, so that the sub suction plate is raised before the main suction plate.

2. The lifting device according to claim 1, wherein the at least one sub suction plate includes a plurality of sub suction plates, wherein at least one first sub suction plate among the plurality of sub suction plates is configured to adsorb an edge portion at one end of the sheet-shaped member, and wherein at least one second sub suction plate among the plurality of sub suction plates is configured to adsorb an edge portion at the other end of the sheet-shaped member located opposite to the one end.

3. The lifting device according to claim 1, wherein the lifting unit includes a first lifting unit that raises one end of the at least one sub suction plate to a first height, among one end of the at least one sub suction plate located at an edge of the sheet-shaped member and the other end of the at least one sub suction plate located at a center of the sheet-shaped member, when the main suction plate and the at least one sub suction plate adsorb the sheet-shaped member.

4. The lifting device according to claim 3, wherein the first lifting unit includes:

a first guide rail extended in a horizontal direction;

a first movement module that moves along the first guide rail; and a first support leg having one end connected to the first movement module and the other end connected to the at least one sub suction plate to support the at least one sub suction plate, and configured to raise the one end of the at least one sub suction plate or lower the raised one end along a movement direction of the first movement module.

5. The lifting device according to claim 4, wherein the first support leg includes at least one joint.

6. The lifting device according to claim 3, wherein the lifting unit further includes a second lifting unit that raises the main suction plate and the at least one sub suction plate to a second height, when the one end of the at least one sub suction plate is raised to the first height.

7. The lifting device according to claim 1, further comprising a posture control unit that connects the at least one sub suction plate and the lifting unit and adjusts the posture of the at least one sub suction plate according to a curve or inclination of the edge portion with which the at least one sub suction plate comes into contact.

8. The lifting device according to claim 7, wherein the posture control unit includes:

an elastic member coupled to the at least one sub suction plate; and a support frame coupled to the lifting unit to support the elastic member.

9. The lifting device according to claim 8, wherein the elastic member includes a plurality of compression springs having one end fixed to the at least one sub suction plate and the other end fixed to the support frame.

10. The lifting device according to claim 1, further comprising a flattening unit that flattens the sheet-shaped member using a roll, before the main suction plate and the at least one sub suction plate come into contact with the sheet-shaped member.

11. The lifting device according to claim 10, wherein the flattening unit includes:

a second guide rail extended in a horizontal direction;

a second movement module that moves along the second guide rail; and a second support leg having one end connected to the second movement module and the other end connected to the roll to support the roll.

12. An electrode sheet transfer apparatus for transferring an electrode sheet using the lifting device according to claims 1.

* * * * *